United States Patent
Delgado (10) Patent No.: US 10,556,975 B2
(45) Date of Patent: Feb. 11, 2020

(54) AQUEOUS POLYMERIZATION OF THERMORESPONSIVE FLOCCULANTS

(71) Applicant: PHILLIPS 66 COMPANY, Houston, TX (US)

(72) Inventor: Paula Delgado, Bartlesville, OK (US)

(73) Assignee: Phillips 66 Company, Houston, TX (US)

( * ) Notice: Subject to any disclaimer, the term of this patent is extended or adjusted under 35 U.S.C. 154(b) by 139 days.

(21) Appl. No.: 15/663,026

(22) Filed: Jul. 28, 2017

(65) Prior Publication Data

US 2018/0072825 A1    Mar. 15, 2018

Related U.S. Application Data (60) Provisional application No. 62/393,900, filed on Sep. 13, 2016.

(51) Int. Cl.

| | |
|---|---|
| *C08F 20/36* | (2006.01) |
| *C08F 20/56* | (2006.01) |
| *C08F 220/56* | (2006.01) |
| *C02F 1/56* | (2006.01) |
| *C08F 220/34* | (2006.01) |

(52) U.S. Cl.
CPC ............... *C08F 20/36* (2013.01); *C02F 1/56* (2013.01); *C08F 20/56* (2013.01); *C08F 220/34* (2013.01); *C08F 220/56* (2013.01)

(58) Field of Classification Search
CPC .................. C08F 20/36; C08F 20/56
See application file for complete search history.

(56) References Cited

U.S. PATENT DOCUMENTS

8,192,918 B2 *  6/2012  Loccufier .............. B41C 1/1008
                                                                          101/453

* cited by examiner

*Primary Examiner* — Robert D Harlan
(74) *Attorney, Agent, or Firm* — Phillips 66 Company (57) ABSTRACT

A method of forming a thermoresponsive polymer. The method begins by forming a monomer solution by mixing

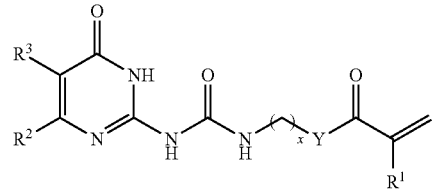

and an optional water soluble monomer in the presence of an aqueous solution. An initiator is then added to the monomer solution to form a thermoresponsive polymer. In this method, R1 can be independently selected from the group consisting of H and alkyl groups; Y can be selected from the group consisting of O, N and S; R2 and R3 can be independently selected from the group consisting of H, alkyl, olefinic, heterocyclic, aromatics, halogens, ammonium salts, nitroxides, nitrates, nitrites, amines, amides, carboxylic acidsacyl chlorides, esters, ethers, alcohols, nitriles, phosphates, phosphonates, sulfates, sulfonates, sulfides, sulfites, thiols, and combinations thereof; and X are methylene groups from about 0 to about 20 carbons.

17 Claims, 6 Drawing Sheets

AQUEOUS POLYMERIZATION OF THERMORESPONSIVE FLOCCULANTS

CROSS-REFERENCE TO RELATED APPLICATIONS

This application is a non-provisional application which claims the benefit of and priority to U.S. Provisional Application Ser. No. 62/393,900 filed Sep. 13, 2016, entitled "Aqueous Polymerization of Thermoresponsive Flocculants," which is hereby incorporated by reference in its entirety.

STATEMENT REGARDING FEDERALLY SPONSORED RESEARCH OR DEVELOPMENT

None.

FIELD OF THE INVENTION

This invention relates to a method of forming thermoresponsive polymers

BACKGROUND OF THE INVENTION

Thermoresponsive polymers are materials that exhibit a drastic and discontinuous change of the physical properties with temperature. Temperature is a stimulus that can be applied easily and reversibly in contrast to, for instance, chemical additives. There are a variety of applications in which thermoresponsive polymers can be used including water clarification, resins, adhesives, printing (ink-jet inks or surface modification), hydrogels, cosmetics, personal care, coatings, drug delivery, polymerization-induced phase separation, and self-healing applications (e.g., synthetic tissue, self-reparable surfaces).

There exists a need for a method of forming thermoresponsive polymers.

BRIEF SUMMARY OF THE DISCLOSURE

A method of forming a thermoresponsive polymer. The method begins by forming a monomer solution by mixing and an optional water soluble monomer in the presence of an aqueous solution. An initiator is then added to the monomer solution to form a thermoresponsive polymer. In this method, R1 can be independently selected from the group consisting of H and alkyl groups; Y can be selected from the group consisting of O, N and S; R2 and R3 can be independently selected from the group consisting of H, alkyl, olefinic, heterocyclic, aromatics, halogens, ammonium salts, nitroxides, nitrates, nitrites, amines, amides, carboxylic acidsacyl chlorides, esters, ethers, alcohols, nitriles, phosphates, phosphonates, sulfates, sulfonates, sulfides, sulfites, thiols, and combinations thereof; and X are methylene groups from about 0 to about 20 carbons.

An alternate method of forming a thermoresponsive polymer is taught where the method begins by forming a monomer solution by mixing from about 0.01 mol % to about 99.99 mol % 2-(3-(4-methyl-6-oxo-1,6-dihydropyrimidin-2-yl)ureido)ethyl methacrylate and from about 0.01 mol % to about 99.99 mol % in the presence of an aqueous salt solution, at a temperature greater than 80° C. The monomer solution is then degassed. An initiator is then added to the monomer solution to form a thermoresponsive polymer. In this embodiment, R4 is selected from the group consisting of H and alkyl groups; and R5 and R6 are independently selected from the group consisting of H, alkyl, olefinic, aromatic, heterocyclic, halogen, ammonium, nitroxides, nitrates, nitrite amides, amines, esters, ethers, carboxylic acids, acyl chlorides, alcohols, nitriles, phosphates, phosphonates, sulfates, sulfonates, sulfide, sulfite, thiol, and combinations thereof.

Yet another embodiment of forming a thermoresponsive polymer is taught. This method begins by forming a monomer solution by mixing from about 0.01 mol % to about 99.99 mol % and from about 0.01 mol % to about 99.99 mol % methacrylamide in the presence of an aqueous salt solution, at a temperature greater than 80° C. The monomer solution is then degassed. An initiator is then added to the monomer solution to form a thermoresponsive polymer. In this embodiment, R1 is selected from the group consisting of H and alkyl groups; Y is selected from the group consisting of O, N and S; R2 and R3 are independently selected from the group consisting of H, alkyl, olefinic, heterocyclic, aromatics, halogens, ammonium salts, nitroxides, nitrates, nitrites, amines, amides, carboxylic acids, acyl chlorides, esters, ethers, alcohols, nitriles, phosphates, phosphonates, sulfates, sulfonates, sulfides, sulfites, thiols, and combinations thereof; and X are methylene groups containing from about 0 to about 20 carbons.

An alternate method of forming a thermoresponsive polymer is taught where the method begins by forming a monomer solution by mixing from about 0.01 mol % to about 99.99 mol % 2-(3-(4-methyl-6-oxo-1,6-dihydropyrimidin-2-yl)ureido)ethyl acrylate and from about 0.01 mol % to about 99.99 mol % in the presence of an aqueous salt solution, at a temperature greater than 80° C. The monomer solution is then degassed. An initiator is then added to the monomer solution to form a thermoresponsive polymer. In this embodiment, R4 is selected from the group consisting of H and alkyl groups; and R5 and R6 are independently selected from the group consisting of H, alkyl, olefinic, aromatic, heterocyclic, halogen, ammonium, nitroxides, nitrates, nitrite amides, amines, esters, ethers, carboxylic acids, acyl chlorides, alcohols, nitriles, phosphates, phosphonates, sulfates, sulfonates, sulfide, sulfite, thiol, and combinations thereof.

Yet another embodiment of forming a thermoresponsive polymer is taught. This method begins by forming a monomer solution by mixing from about 0.01 mol % to about 99.99 mol % and from about 0.01 mol % to about 99.99 mol % acrylamide in the presence of an aqueous salt solution, at a temperature greater than 80° C. The monomer solution is then degassed. An initiator is then added to the monomer solution to form a thermoresponsive polymer. In this embodiment, R1 is selected from the group consisting of H and alkyl groups; Y is selected from the group consisting of O, N and S; R2 and R3 are independently selected from the group consisting of H, alkyl, olefinic, heterocyclic, aromatics, halogens, ammonium salts, nitroxides, nitrates, nitrites, amines, amides, carboxylic acids, acyl chlorides, esters, ethers, alcohols, nitriles, phosphates, phosphonates, sulfates, sulfonates, sulfides, sulfites, thiols, and combinations thereof; and X are methylene groups containing from about 0 to about 20 carbons.

BRIEF DESCRIPTION OF THE DRAWINGS

A more complete understanding of the present invention and benefits thereof may be acquired by referring to the follow description taken in conjunction with the accompanying drawings in which.

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

Figure 1:
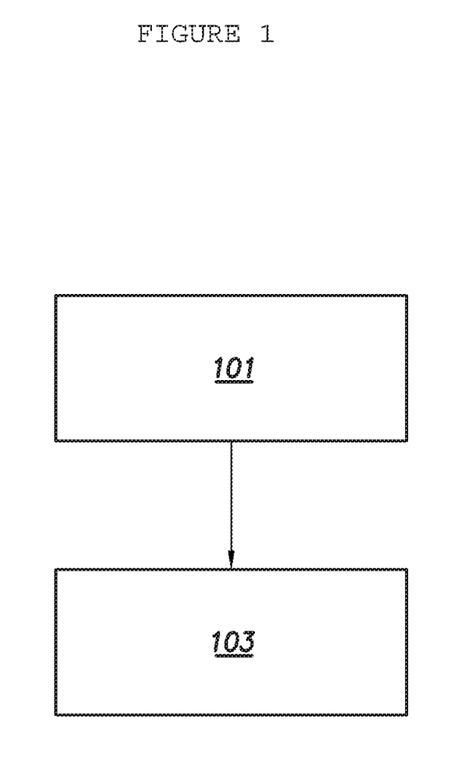
FIG. 1 depicts the method of forming a thermoresponsive polymer.

A method of forming a thermoresponsive polymer or a water-soluble thermoresponsive polymer is shown in FIG. 1. The method begins by mixing and an optional water soluble monomer in the presence of an aqueous solution to form a monomer solution 101. An initiator can then then added to monomer solution to form a thermoresponsive polymer 103. In this method, R1 can be independently selected from the group consisting of H and alkyl groups; Y can be selected from the group consisting of O, N and S; R2 and R3 can be independently selected from the group consisting of H, alkyl, olefinic, heterocyclic, aromatics, halogens, ammonium salts, nitroxides, nitrates, nitrites, amines, amides, carboxylic acidsacyl chlorides, esters, ethers, alcohols, nitriles, phosphates, phosphonates, sulfates, sulfonates, sulfides, sulfites, thiols, and combinations thereof; and X are methylene groups containing from about 0 to about 20 carbons.

In one embodiment, since the water soluble monomer is optional, it is possible that a homopolymer is made from Upon completion of polymerization, the polymer exhibits thermoresponsive behavior through hydrogen bonding. When bonded together the hydrogen bonding groups can be either bonded to water, with complementary hydrogen bonding groups or could be self-complementary bonded.

In one embodiment, the average molecular weight of the thermoresponsive polymer is greater than 50,000. In other embodiments, the average molecular weight is greater than 60,000, 62,000, 65,000, 70,000, 71,000, 75,000 even greater than 80,000.

In one embodiment the water soluble monomer can be monofunctional acrylic monomers, multifunctional acrylic monomers, monofunctional vinyl monomers, multifunctional vinyl monomers and combinations thereof. Non-limiting examples of acrylic monomers include: acrylamide, acrylic acid and its salts, methacrylamide, diacetone acrylamide, methacrylic acid and its salts, alkyl acrylates (methyl, ethyl, propyl, etc.), alkyl methacrylates (methyl, ethyl, propyl, etc.), vinyl acetates, dialkylaminoethyl acrylates or methacrylates and its methylchloride and methosulfate quaternaries salts, dialkylamino acrylates or methacrylates, hydroxyalkyl acrylates or methacrylates, acrylamidoalkylsulfonic acids or phosphonic acid, and their salts, methacrylamido-alkylsulfonic acids or phosphonic acid, and their salts, acrylamidoalkyl-trimethylammonium salts methacrylamidoalkyl-trimethylammonium salts, dialkylaminopropylacrylamides, dialkylaminopropylmethacrylamides, alkylaminopropylacrylamide, and alkylaminopropylmethacrylamide, methacrylamidopropylhydroxyethyldialkylammonium acetate, or derivatives and mixtures thereof. Non-limiting examples of vinyl monomers include: vinyl alkylethers, styrene sulfonic acid and its salts, vinyl sulfonic acid derivatives, vinyl pyridines, vinyl pyrrolidones, vinyl imidazoles, diallyldimethylammonium chloride, styrene sulfonic acid and its salts, or derivatives and mixtures thereof.

In one embodiment the aqueous solution can be an aqueous salt solution. Examples of the salinity of the aqueous salt solution can be brackish water (0.0001-3%), saline water (3-5%) or brine water (greater than 5%). The salination of the aqueous salt solution can be from any type of salt such as those formed from any monovalent and multivalent cation and any monovalent and multivalent anion. Non-limiting examples of cations include: sodium, potassium, calcium, magnesium, lithium and aluminum. Non-limiting examples of anions include chloride, hydroxide, phosphate, acetate, sulfates, pyrophosphates and carbonates. In one embodiment the aqueous solution can specifically exclude solvents such as organic solvents.

In another embodiment the initiator can be any water soluble addition-type initiator, such as radical initiators. Non-limiting examples of additional type initiators that can be used include, azo initiators, peroxides, persulfates and redox systems. In one embodiment the initiator can also be a UV initiator. Non-limiting examples of peroxide initiators include: persulfate salts, hydrogen peroxide, alkyl peroxide, alkyl peroxyesters, peroxydicarbonates, hydroperoxides and combinations thereof. Non-limiting examples of azo initiators include: 4,4'-azobis(4-cyanovaleric acid), 4,4'-azobis-(4-cyanopentanoic acid), 2,2'-azobis(2-methylpropionamidine)dihydrochloride, 2,2'-azobis [2-(2-imidazolin-2-yl)propane]dihydrochloride, 2,2'-azobis[N-(2-carboxyethyl)-2-methylpropionamidine] tetrahydrate, 2,2'-azobis[2-(2-imidazolin-2-yl)propane], 2,2'-azobis[2-methyl-N-(2-hydroxyethyl)propionamide], 2,2'-azobis-(2-amidinopropane) dihydrochloride, 2,2'-azobis(N,N'-dimethylene isobutyramidine) dihydrochloride, 2,2'-zobis (N,N'-dimethylene isobutyramidine), 2,2'-azobis-(isobutyramide)dehydrate, 2,2'-azobis-(N-ethylamidinopropane hydrochloride), 2,2'-azobis-(N,N'-dimethyleneamidinopropane hydrochloride), 2,2'-azobis(2-propane-2-carboxylic acid), 2,2'-azobis-(2-methyl-N-(2-hydroxyethyl))propionamide, 2,2'-azobis-[2-methyl-N-(1,1-bis(hydroxymethyl)]propionamide, 2,2'-azobis-[2-methyl-N-(1,1-bis(hydroxymethyl)-2-hydroxyethyl)]propionamide and combinations thereof.

In one embodiment the initiator can be dissolved in the same or different aqueous solution in molar ratios of 1:5 to 1:10000 with respect to the molar concentration of the monomer solution to form the thermoresponsive polymer. Examples of ranges in molar ratios from 1:5, 1:10, 1:25, 1:50 1:75, 1:100, 1:500, 1:1000, 1:1500, 1:2000, 1:2500, 1:3000, 1:3500, 1:4000, 1:4500, 1:5000, 1:5500, 1:6000, 1:6500, 1:7000, 1:7500, 1:8000, 1:8500, 1:9000, 1:9500, 1:10000 or any range in between the numbers given.

In one embodiment the monomer solution is heated to a temperature greater than 30° C., 35° C., 40° C., 45° C., 50° C., 55° C., 60° C., 65° C., 70° C., 75° C., 80° C., 85° C., 90° C., 95° C., 100° C., 105° C., 110° C., 115° C., 120° C., 125° C., 130° C., 135° C., 140° C., 145° C., 150° C., 155° C., 160° C., 165° C., 170° C., 175° C., 180° C., 185° C., 190° C., 195° C., or even greater than 200° C. The heating of the monomer solution can occur either by directly heating the monomer solution, incorporating the monomer solution into another solution with a greater temperature than the monomer solution, or any other method known of heating the monomer solution.

In another embodiment the mixing of the monomer solution occurs at an elevated temperature. Examples of the temperature in which the monomer solution can be mixed in include temperature greater than 30° C., 35° C., 40° C., 45° C., 50° C., 55° C., 60° C., 65° C., 70° C., 75° C., 80° C., 85° C., 90° C., 95° C., 100° C., 105° C., 110° C., 115° C., 120° C., 125° C., 130° C., 135° C., 140° C., 145° C., 150° C., 155° C., 160° C., 165° C., 170° C., 175° C., 180° C., 185° C., 190° C., 195° C., or even greater than 200° C. The mixing of the monomer solution at an elevated temperature can occur by heating one component of the monomer solution, heating multiple components of the monomer solution or any other known method of mixing the monomer solution at an elevated temperature. This monomer solution can then be optionally degassed at room temperature or the temperatures above. The reaction time can be any time necessary for conversion of monomers, and water soluble monomer, within the monomer solution to polymers. Additionally, the reaction time can be any time necessary for the reaction of monomers, and water soluble monomer to take place.

Figure 2:
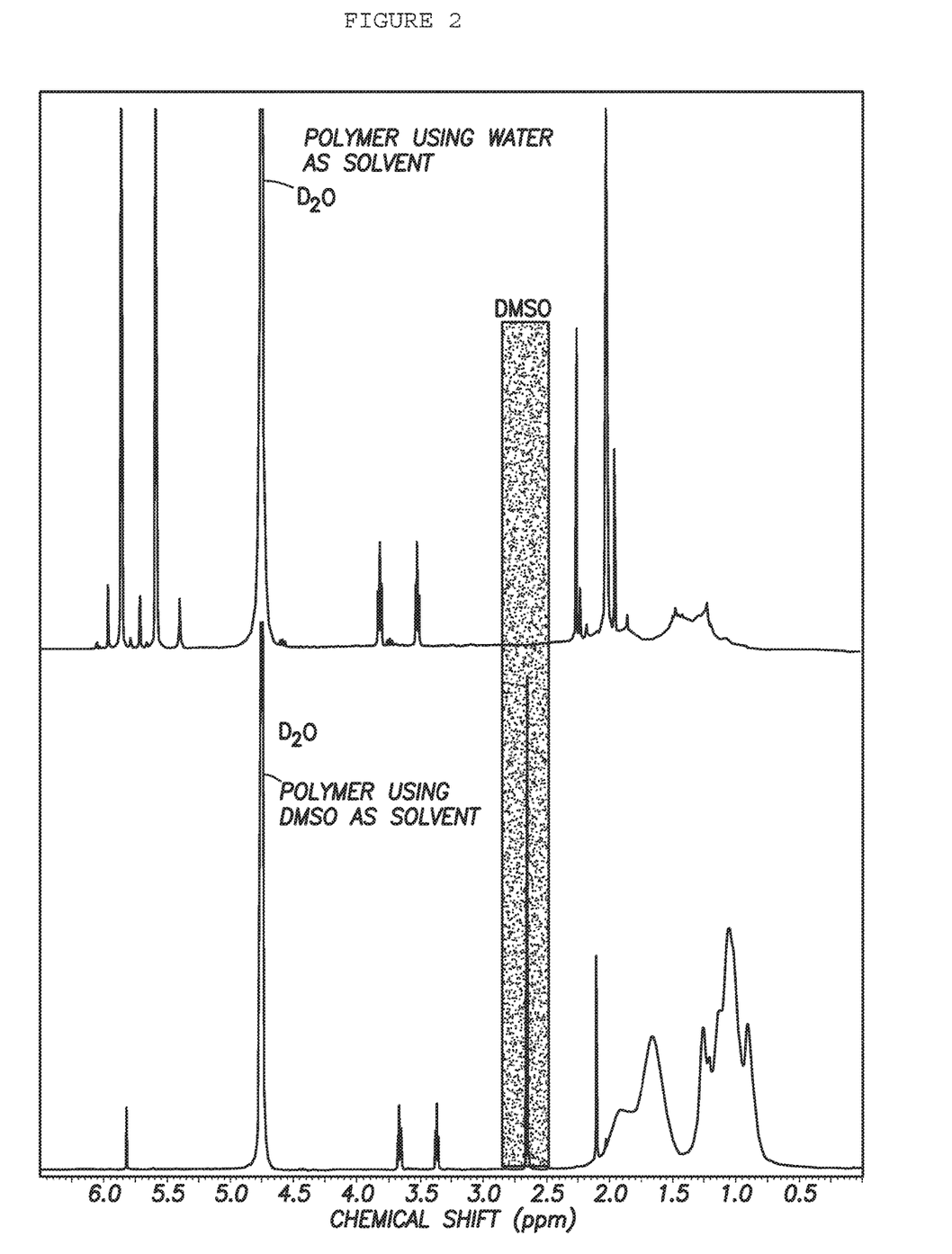
FIG. 2 depicts a NMR comparison of a thermoresponsive polymer made with an organic solvent versus one made with water.

In one embodiment an aqueous solvent is used to mix the two monomers to make a thermoresponsive polymer. It is envisioned that when an aqueous solvent of water is used to the resultant thermoresponsive polymer will not have any organic solvent contaminants and as such may only require an optional purification step. In other embodiments, the solvent can be water with inorganic salts, such as electrolyte solutions. Any conventionally known inorganic salts can be used. FIG. 2 depicts a NMR comparison of using an organic solvent as a solvent versus using water. As shown in the Figure, the organic solvent of dimethyl sulfoxide can be difficult to remove from the polymer and can result in a polymer with an organic solvent contaminant. When the solvent is water it is envisioned that the purification step can be optional.

In one embodiment, no purification step is performed after forming the thermoresponsive polymer. In another embodiment, an optional step is to have the thermoresponsive polymer filtered or washed with water to remove excess of initiator and/or salt. This is an optional step as tests have shown that using the thermoresponsive polymer without a purification step maintains the polymer properties. Possible applications of the thermoresponsive polymers are oil, grease and turbidity clarification. In this case the clarification performance of the polymer without purification is similar when compared to forming the thermoresponsive polymer using an organic solvent that utilizes a purification step. In fact a thermoresponsive polymer formed via an organic solvent method cannot operate to produce turbidity removal nor total oil and grease removal without a purification step while a thermoresponsive polymer formed via an aqueous solution can.

The reaction time to create the polymers can range from less than ten minutes, less than 15 minutes, less than half an hour, less than an hour, less than 2 hours, less than 4 hours, or even less than 24 hours. The reaction time is theorized to be dependent upon the starting materials.

In one embodiment the ratio of 2-(3-(4-methyl-6-oxo-1,6-dihydropyrimidin-2-yl)ureido)ethyl methacrylate to water soluble monomer in monomer solution ranges in mole percentage from 0.01:99.99, 0.05:99.5, 1:99, 2:98, 3:97, 4:96, 5:95, 6:94, 7:93, 8:92, 9:91, 10:90, 11:89, 12:88, 13:87, 14:86, 15:85, 16:84, 17:83, 18:82, 19:81, 20:80, 21:79, 22:78, 23:77, 24:76, 25:75, 26:74, 27:73, 28:72, 29:71, 30:70, 31:69, 32:68, 33:67, 34:66, 35:65, 36:64, 37:63, 38:62, 39:61, 40:60, 41:59, 42:58, 43:57, 44:56, 45:55, 46:54, 47:53, 48:52, 49:51, 50:50, 51:49, 52:48, 53:47, 54:46, 55:45, 56:44, 57:43, 58:42, 59:41, 60:40, 61:39, 62:38, 63:37, 64:36, 65:35, 66:34, 67:33, 68:32, 69:31, 70:30, 71:29, 72:28, 73:27, 74:26, 75:25, 76:24, 77:23, 78:22, 79:21, 80:20, 81:19, 82:18, 83:17, 84:16, 85:15, 86:14, 87:13, 88:12, 89:11, 90:10, 91:9, 92:8, 93:7, 94:6, 95:5, 96:4, 97:3, 98:2, 99:1, 99.5:0.05, 99.99:0.01, 100:0 or any range in between the numbers given.

There are a variety of methods in which the thermoresponsive polymer can be incorporated into the water depending upon its usage. The usage of the thermoresponsive polymer can be for water clarification, resins, adhesives, printing (ink-jet inks or surface modification), hydrogels, cosmetics, personal care, coatings, drug delivery, polymerization-induced phase separation, and self-healing applications (e.g., synthetic tissue, self-reparable surfaces). In one method it is possible that the thermoresponsive polymer is directly added into the wastewater. In another method, the thermoresponsive polymer is dissolved in a chemical solution, which solubilizes the polymer, and then incorporated in the wastewater. In one example the chemical is Sodium Chloride (NaCl). The amount of chemical added can be from about 0.0001 wt % to about 30 wt %, or from any amount greater than about 0.0005 wt %, 0.001 wt %, 0.005 wt %, 0.01 wt %, 0.05 wt %, 0.1 wt %, 0.5 wt %, 1 wt %, to any amount smaller than about 25 wt %, 20 wt %, 15 wt %, 10 wt %, or even about 5 wt %.

Examples of wastewater can be from refineries such as desalter effluent, from paper making facilities, from municipal water treatment facilities or any other facility that produces wastewater. Wastewater can be broadly defined as any aqueous environment that has high inorganic salts content (broadly defined as greater than or equal to 100 ppm, greater than or equal to 200 ppm or around or around 1000 ppm), suspended solids (≤500 ppm), hydrocarbons (as free and/or emulsified oil), other organics and inorganics or combinations thereof.

The following examples of certain embodiments of the invention are given. Each example is provided by way of explanation of the invention, one of many embodiments of the invention, and the following examples should not be read to limit, or define, the scope of the invention.

EXAMPLE 1

Conventional Method

The amounts of 2-(3-(4-methyl-6-oxo-1,6-dihydropyrimidin-2-yl)ureido)ethyl methacrylate (MAUPy) and methacrylamide (MAAm) listed in Table 1, along with 1.2 mL of dimethyl sulfoxide solvent, were added to a 50 mL Schlenk flask equipped with a stir bar. The chemicals started to dissolve after immersing the flask in a 70° C. oil bath under strong stirring. When the solution was homogenous, the system was degassed by freeze-pump thaw or by bubbling an inert gas. After degassing, the solution was again immersed into the 70° C. oil bath to preserve the monomers in solution. In a separate small vial, the corresponding amount of azobisisobutyronitrile (AIBN) was dissolved in 100 μL of dimethyl sulfoxide solvent (DMSO), and subsequently degassed. The polymerization started after the addition of the azobisisobutyronitrile solution to the reaction flask at 70° C. under an inert atmosphere. These conditions were maintained for 4 h. The polymerization was then quenched by exposing the reaction mixture to air at room temperature or by adding a radical inhibitor. Polymers were purified by 24 h of stirring in methanol (100 mL) followed by 24 h of dialysis in methanol (3000 g mol$^{-1}$ cut off).

TABLE 1

| Sample | MAAm ratio | MAUPy amount | MAAm amount | AIBN amount |
|---|---|---|---|---|
| Poly(MAUPy)-100 | 0 | 100 mg, 3.6 × 10−1 mmol | | 0.117 mg, 7.1 × 10−4 mmol |
| Poly(MAUPy-MAAm)-70 | 30 | 100 mg, 3.6 × 10−1 mmol | 13.01 mg, 0.15 mmol | 0.17 mg, 1.0 × 10−3 mmol |
| Poly(MAUPy-MAAm)-50 | 50 | 100 mg, 3.6 × 10−1 mmol | 30.37 mg, 0.36 mmol | 0.23 mg, 1.4 × 10−3 mmol |
| Poly(MAUPy-MAAm)-20 | 80 | 100 mg, 3.6 × 10−1 mmol | 121.48 mg, 1.43 mmol | 0.59 mg, 3.6 × 10−3 mmol |
| Poly(MAUPy-MAAm)-10 | 90 | 100 mg, 3.6 × 10−1 mmol | 273.32 mg, 3.24 mmol | 1.17 mg, 7.1 × 10−3 mmol |
| Poly(MAUPy-MAAm)-5 | 95 | 100 mg, 3.6 × 10−1 mmol | 577.01 mg, 6.78 mmol | 2.34 mg, 1.4 × 10−2 mmol |
| Poly(MAUPy-MAAm)-2 | 98 | 100 mg, 3.6 × 10−1 mmol | 1.49 g, 17.49 mmol | 5.86 mg, 3.6 × 10−2 mmol |

EXAMPLE 2

The amounts of 2-(3-(4-methyl-6-oxo-1,6-dihydropyrimidin-2-yl)ureido)ethyl methacrylate (MAUPy), methacrylamide (MAAm) and sodium pyrophosphate decahydrated (SPP) listed in Table 2, along with 6 mL of water, were added to a 50 mL Schlenk flask equipped with a stir bar. The chemicals started to dissolve after immersing the flask in a 90° C. oil bath under strong stirring. When the solution was homogenous, the system was degassed by freeze-pump thaw or by bubbling an inert gas. In a separate small vial, the corresponding amount of azobis(2-methylpropionamidine) dihydrochloride (AIBA) and 200 µL of water was degassed by argon flow. The polymerization started after the addition of the AIBA solution to the reaction flask at 90° C. under an inert atmosphere. The polymerization was then quenched when the polymer precipitates out of solution. Polymers can then be optionally filtered and washed with water to remove excess of initiator and salt or used as is.

TABLE 2

| Sample | MAUPy | MAAm | Salt (SPP) | AIBA | Monomer produced |
|---|---|---|---|---|---|
| Poly(MAUPy)-100 | 100 mg | — | 523.4 | 1.2 mg | 0.04M |
|  |  |  |  | $4.5 \times 10^{-6}$ mmol |  |
| Poly(MAUPy-MAAm)-5 | 100 mg | 577.01 mg | 287 mg | 3.27 mg | 1.3M |
|  | $3.6 \times 10^{-6}$ mmol | 6.78 mmol | $6.4 \times 10^{-1}$ mmol | $8.8 \times 10^{-3}$ mmol |  |
| Poly(MAUPy-MAAm)-5-not purified | 100 mg | 577.01 mg | 327 mg | 3.27 mg | 1.3M |
|  | $3.6 \times 10^{-6}$ mmol | 6.78 mmol | $7.3 \times 10^{-1}$ mmol | $8.8 \times 10^{-3}$ mmol |  |

Comparison

Jar tests were performed using synthetic wastewater for the use of these polymers in oily wastewater clarification. The jar test experiments were performed using 500 mL of synthetic wastewater at 70° C. This emulsion did not need pH adjustment as alkalinity (300 ppm) regulated the pH to 8.5. A coagulant is used to destabilize the synthetic wastewater. Then, the thermoresponsive polymer solution was added, and the solution was maintained at 70° C. at 200 rpm for 2 minutes. Then, the solution was removed from heat and let settled for 2 hours.

Turbidity measurements were performed on a Hach 2100N tubidimeter with ±2% (0.01-1000 NTU) accuracy. The turbidity efficiency was calculated from the following formula:

Turbidity Efficiency (%)=$(T_0-T)/T_0 \times 100$ where $T_0$ and T are the turbidity before and after clarification, respectfully.

Total oil and grease (TOG) values were monitored by using an InfraCal TOG/TPH analyzer using tetrachloroethylene as a solvent and calculated using the following formula:

Total Oil and Grease efficiency (%)=$(TOG_0-TOG)/TOG_0 \times 100$ where $TOG_0$ and TOG are the total oil and grease values before and after clarification, respectively.

The results of the jar tests experiments are shown in Table 3

TABLE 3

| Solvent/Solution | Initiator | Clarification (Turbidity, %) | Clarification (TOG, %) |
|---|---|---|---|
| DMSO no purification | AIBN | N/A Did not work | N/A Did not work |
| DMSO | AIBN | 98 ± 2 | 96 ± 15 |
| Water, SPP | AIBA | 98 ± 2 | 98 ± 15 |
| Water, SPP no purification | AIBA | 96 ± 2 | 96 ± 15 |

EXAMPLE 3

Figure 3:
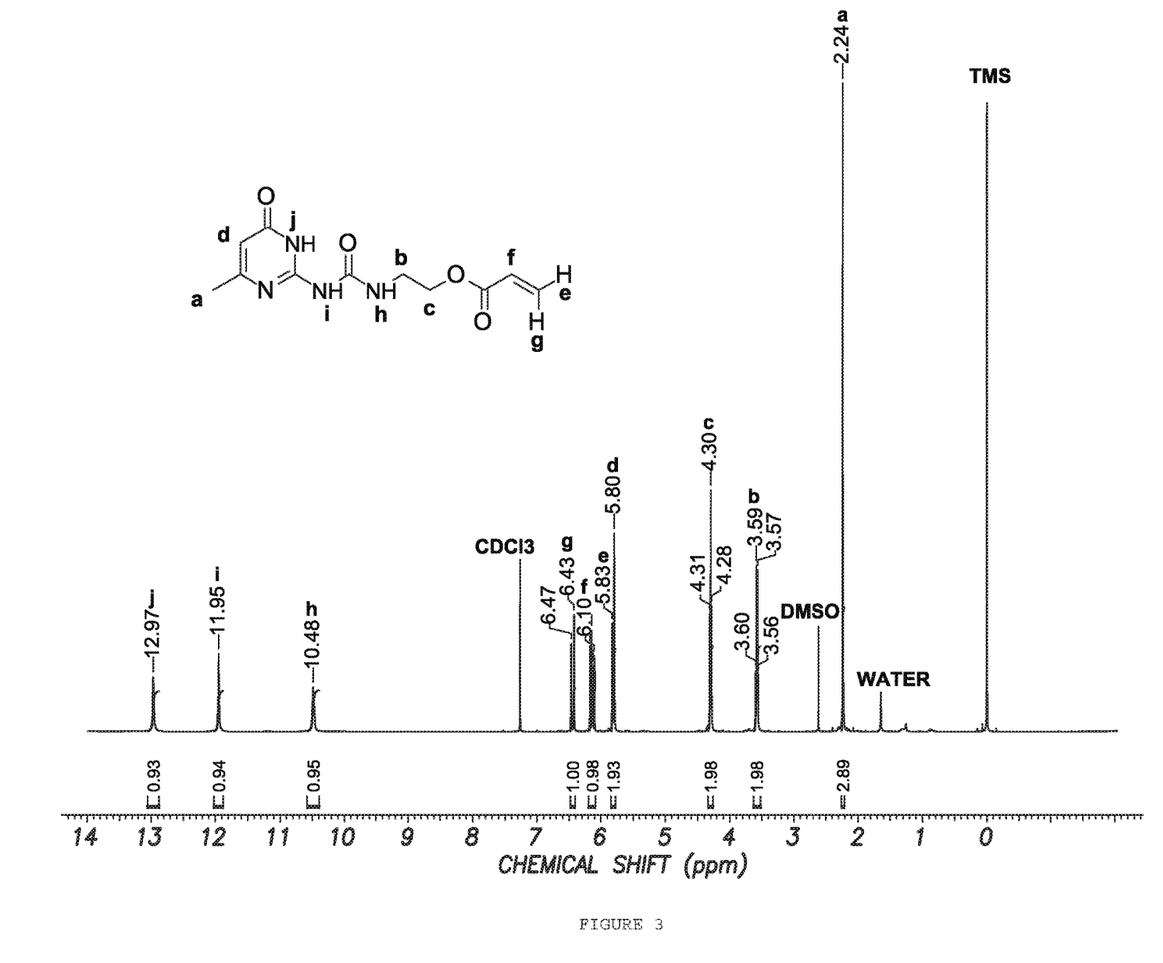
FIG. 3 depicts a $^1$H NMR of 2-(3-(4-methyl-6-oxo-1,6-dihydropyrimidin-2-yl)ureido)ethyl acrylate.
Figure 4:
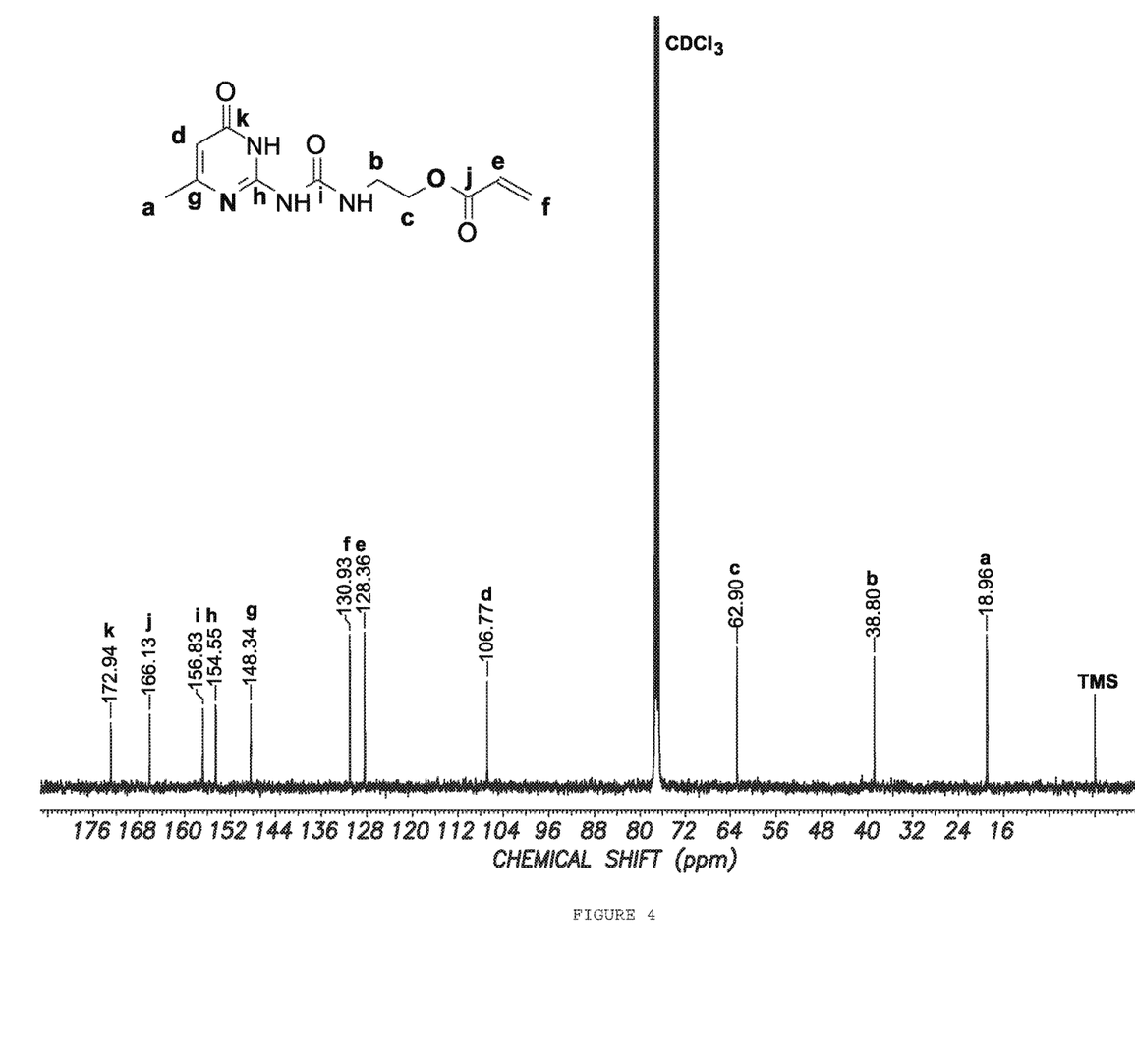
FIG. 4 depicts a $^{13}$C NMR of 2-(3-(4-methyl-6-oxo-1,6-dihydropyrimidin-2-yl)ureido)ethyl acrylate.
Figure 5:
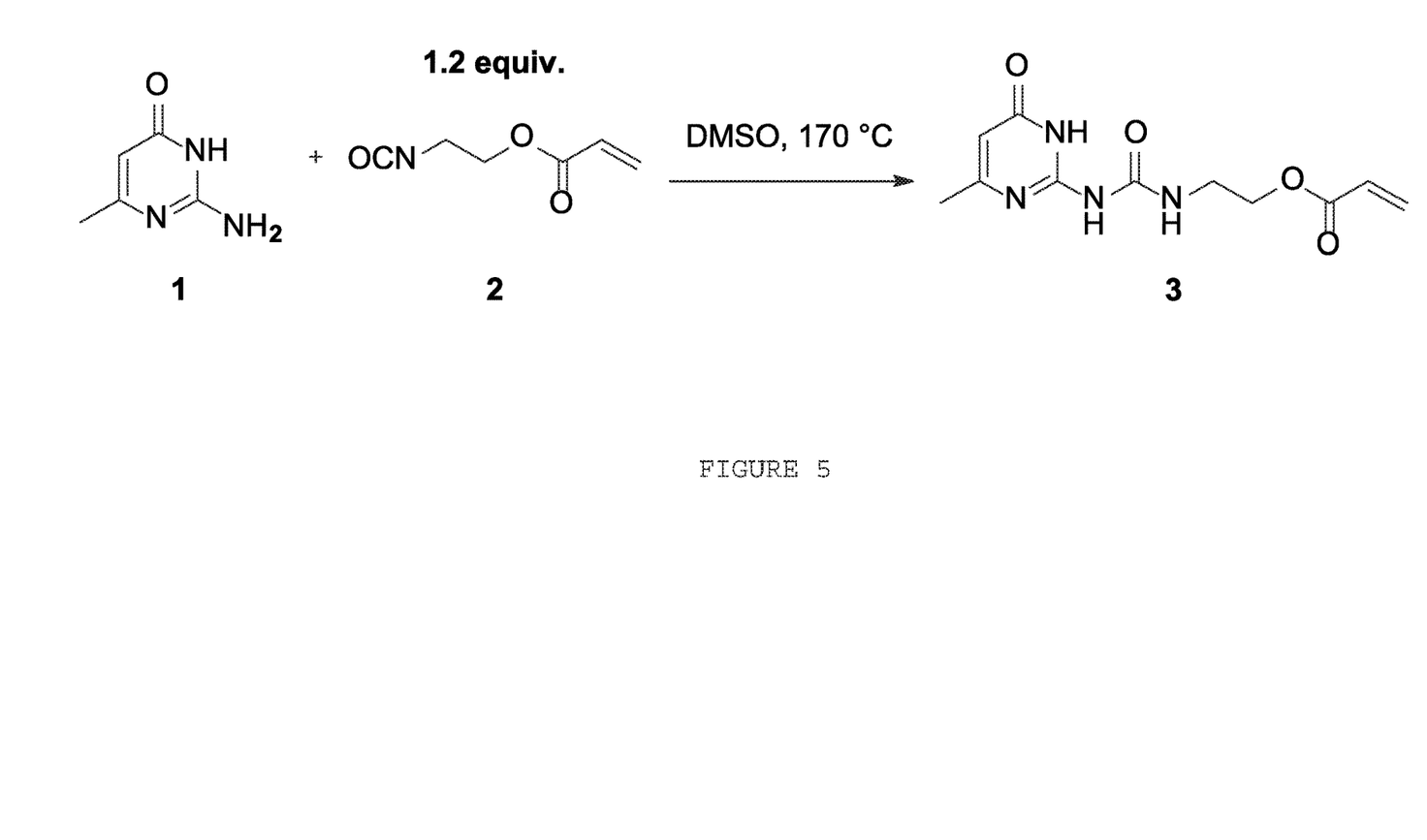
FIG. 5 depicts a reaction scheme.

Synthesis of 2-(3-(4-methyl-6-oxo-1,6-dihydropyrimidin-2-yl)ureido)ethyl acrylate (AUPy): To a round bottom flask equipped with a magnetic stir bar 6-methyl isocytosine (4.0 g, 32 mmol) and 50 mL dimethyl sulfoxide solvent were added. In order to dissolve the 6-methyl isocytosine in the DMSO, the flask was sealed with a septum and heated to 170° C. using an oil bath. Upon dissolution, the oil bath was removed and 2-isocyanatoethyl acrylate (4.8 mL, 38 mmol) was added via syringe. The reaction was then quenched by cooling the reaction flask in a 2-propanol/$CO_{2(s)}$ bath. After 5-10 min of cooling the reaction flask was thawed using an ambient temperature water bath and the white solid was washed 3×1000 mL with cold water (stirring for ≥60 min per wash), filtered, and dried at reduced pressure overnight to yield 7.57 g of white powder (89% yield). FIG. 3 depicts the H NMR of the AUPy and FIG. 4 depicts the C NMR of the AUPy. FIG. 5 depicts the reaction scheme for this reaction.

Figure 6:
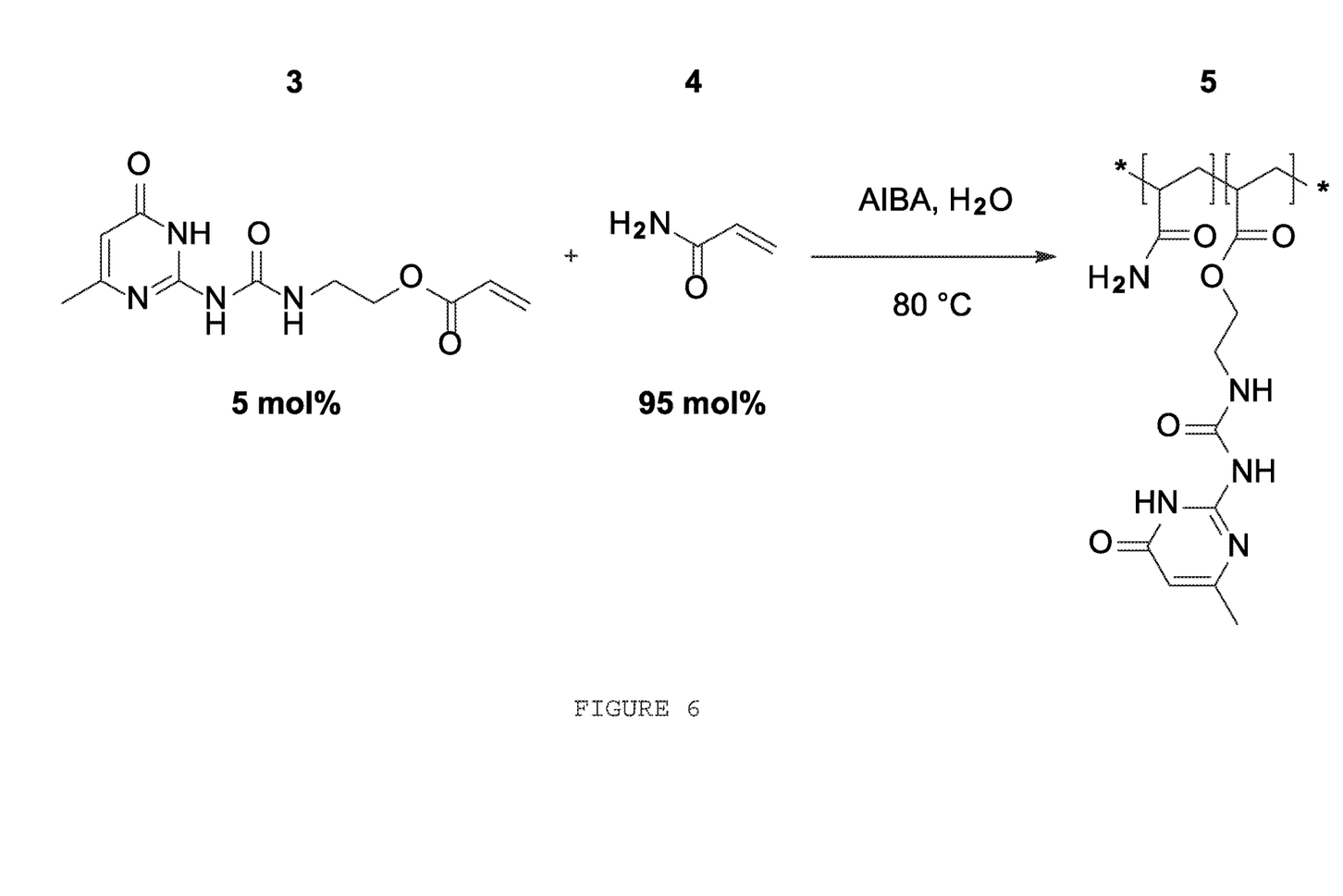
FIG. 6 depicts a reaction scheme.

Synthesis of Poly [acrylamide-co-2-(3-(4-methyl-6-oxo-1,6-dihydropyrimidin-2-yl)ureido)ethyl acrylate], poly (AUPy-AAm)-5: To a 25 mL round bottom flask equipped with a magnetic stirrer, 0.20 g AUPy, 1.02 g acrylamide (AAm), 0.05 g sodium carbonate, and 12 mL water was added. The flask was immersed in an 80° C. oil bath to dissolve the solids and the mixture was degassed by argon flow for 30 minutes. In a 2 mL vial, 0.0065 g 2,2'-Azobis (2-methylpropionamidene) dihydrochloride (AIBA) was added to 0.2 mL water. The AIBA solution was degassed by argon flow and transferred to the round bottom flask using a 1 mL syringe to initiate the polymerization. This method generates poly(AUPy-AAm)-5, a copolymer that consists of 95 mol % AAm and 5 mol % AUPy and with a monomer to initiator ratio of 600 to 1. FIG. 6 depicts the reaction scheme for this reaction.

The reaction mixture was purified by stirred at 500 rpm for 4 hours, and an opaque and viscous solution was obtained. The polymer was precipitated from solution as white solids by slowly adding equal volume of acetone to reaction mixture. The polymer-acetone-water slurry was separated by centrifugation (5000 rpm, 5 min), the liquid was decanted, and the resulting solid material was dried at reduced pressure to yield 1.19 g of white powder (97% yield).

EXAMPLE 3

Random copolymer of 5 mol% of 2-(3-(4-methyl-6-oxo-1,6-dihydropyrimidin-2-yl)ureido)ethyl methacrylate and 95 mol % of methacrylamide were synthesized in water and inorganic salts and purified with perchlorate (sample DI-Perchlorate), synthesized in water and inorganic salts and purified with hydrochloric acid (sample DI-HCl), and synthesized in DMSO and washed in water(sample DMSO-DI). The apparent viscosity, specific viscosity and weight average molecular weight are shown in Table 4.

TABLE 4

| Polymer | Apparent Viscosity mPa-s | Specific Viscosity (a.u.) | Mw (g/mol)$^2$ |
| --- | --- | --- | --- |
| DI-Perchlorate | 1.051 ± 0.016 | 0.289 | 62,200 ± 6,000 |
| DI-HCl | 1.060 ± 0.014 | 0.300 | 65,600 ± 5,000 |
| DMSO-DI | 1.074 ± 0.002 | 0.317 | 71,000 ± 1,000 |

In closing, it should be noted that the discussion of any reference is not an admission that it is prior art to the present invention, especially any reference that may have a publication date after the priority date of this application. At the same time, each and every claim below is hereby incorporated into this detailed description or specification as an additional embodiment of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:
1. A method comprising:
forming a monomer solution by mixing formula and a water soluble monomer in the presence of an aqueous solution;
adding an initiator to the monomer solution to form a thermoresponsive polymer, wherein:
R1 is independently selected from the group consisting of H and alkyl groups;
R2 and R3 are independently selected from the group consisting of H, alkyl, olefinic, aromatics, heterocyclic, halogen, ammonium, nitroxides, nitrates, nitrite amides, amines, esters, ethers, carboxylic acids, acyl chlorides, alcohols, nitriles, phosphates, phosphonates, sulfates, sulfonates, sulfide, sulfite, thiol, and combinations thereof;
Y is selected from the group consisting of O, N and S;
X are methylene groups containing from about 0 to about 20 carbons, and
wherein the aqueous solution is an aqueous salt solution.

2. The method of claim 1, wherein the water soluble monomer is selected from the group consisting of: monofunctional acrylic monomers, multifunctional acrylic monomers, monofunctional vinyl monomers, multifunctional vinyl monomers and combinations thereof.

3. The method of claim 1, wherein monomer solution is heated to a temperature greater than 50° C.

4. The method of claim 1, wherein monomer solution is heated to a temperature greater than 85° C.

5. The method of claim 1, wherein the initiator is an addition-type initiator.

6. The method of claim 1, wherein the initiator is selected from the group consisting of: azo initiators, peroxide initiators, persulfate initiators and combinations thereof.

7. The method of claim 6, wherein the peroxide initiator is selected from the group consisting of: persulfate salts, hydrogen peroxide, alkyl peroxide, alkyl peroxyesters, peroxydicarbonates, hydroperoxides and combinations thereof.

8. The method of claim 6, wherein the azo initiator is selected from the group consisting of: 4,4'-azobis(4-cyanovaleric acid), 4,4'-azobis-(4-cyanopentanoic acid), 2,2'-azobis(2-methylpropionamidine)dihydrochloride, 2,2'-azobis[2-(2-imidazolin-2-yl)propane]dihydrochloride, 2,2'-azobis[N-(2-carboxyethyl)-2-methylpropionamidine] tetrahydrate, 2,2'-azobis[2-(2-imidazolin-2-yl)propane], 2,2'-azobis[2-methyl-N-(2-hydroxyethyl)propionamide], 2,2'-azobis-(2-amidinopropane)dihydrochloride, 2,2'-azobis (N,N'-dimethylene isobutyramidine) dihydrochloride, 2,2'-zobis(N,N'-dimethylene isobutyramidine), 2,2'-azobis-(isobutyramide)dehydrate, 2,2'-azobis-(N-ethylamidinopropane hydrochloride), 2,2'-azobis-(N,N'-dimethyleneamidinopropane hydrochloride), 2,2'-azobis(2-propane-2-carboxylic acid), 2,2'-azobis-(2-methyl-N-(2-hydroxyethyl))propionamide, 2,2'-azobis-[2-methyl-N-(1,1-bis(hydroxymethyl)]propionamide, 2,2'-azobis-[2-methyl-N-(1,1-bis(hydroxymethyl)-2-hydroxyethyl)]propionamide and combinations thereof.

9. The method of claim 1, wherein the initiator is azobis (2-methylpropionamidine) dihydrochloride.

10. The method of claim 1, wherein the water soluble monomer is acrylamide.

11. The method of claim 1, wherein the mixing of monomer solution occurs at an elevated temperature.

12. The method of claim 11, wherein the elevated temperature is greater than 50° C.

13. The method of claim 1, wherein the thermoresponsive polymer is water soluble.

14. The method of claim 1, wherein the thermoresponsive polymer has an average molecular weight greater than 50,000.

15. A method comprising:
forming a monomer solution by mixing formula and a water soluble monomer in the presence of an aqueous solution;
  adding an initiator to the monomer solution to form a thermoresponsive polymer, wherein:
  R1 is independently selected from the group consisting of H and alkyl groups;
  R2 and R3 are independently selected from the group consisting of H, alkyl, olefinic, aromatics, heterocyclic, halogen, ammonium, nitroxides, nitrates, nitrite amides, amines, esters, ethers, carboxylic acids, acyl chlorides, alcohols, nitriles, phosphates, phosphonates, sulfates, sulfonates, sulfide, sulfite, thiol, and combinations thereof;
  Y is selected from the group consisting of O, N and S;
  X are methylene groups containing from about 0 to about 20 carbons, and
  wherein the aqueous solution is brackish water.

16. A method comprising:
forming a monomer solution by mixing formula and a water soluble monomer in the presence of an aqueous solution;
  adding an initiator to the monomer solution to form a thermoresponsive polymer, wherein:
  R1 is independently selected from the group consisting of H and alkyl groups;
  R2 and R3 are independently selected from the group consisting of H, alkyl, olefinic, aromatics, heterocyclic, halogen, ammonium, nitroxides, nitrates, nitrite amides, amines, esters, ethers, carboxylic acids, acyl chlorides, alcohols, nitriles, phosphates, phosphonates, sulfates, sulfonates, sulfide, sulfite, thiol, and combinations thereof;
  Y is selected from the group consisting of O, N and S;
  X are methylene groups containing from about 0 to about 20 carbons, and
  wherein the aqueous solution is saline water.

17. A method comprising:
forming a monomer solution by mixing formula and a water soluble monomer in the presence of an aqueous solution;
  adding an initiator to the monomer solution to form a thermoresponsive polymer, wherein:
  R1 is independently selected from the group consisting of H and alkyl groups;
  R2 and R3 are independently selected from the group consisting of H, alkyl, olefinic, aromatics, heterocyclic, halogen, ammonium, nitroxides, nitrates, nitrite amides, amines, esters, ethers, carboxylic acids, acyl chlorides, alcohols, nitriles, phosphates, phosphonates, sulfates, sulfonates, sulfide, sulfite, thiol, and combinations thereof;
  Y is selected from the group consisting of O, N and S;
  X are methylene groups containing from about 0 to about 20 carbons, and
  wherein the aqueous solution is brine water.

* * * * *